United States Patent [19]
Pratt et al.

[11] Patent Number: 5,681,515
[45] Date of Patent: Oct. 28, 1997

[54] METHOD OF FABRICATING AN ELASTOMERIC KEYPAD

[75] Inventors: Steven D. Pratt, Plantation; Andrzej T. Guzik, Pompano Beach; Robert Leon, Miami; Sivakumar Muthuswamy, Plantation, all of Fla.

[73] Assignee: Motorola, Inc., Schaumburg, Ill.

[21] Appl. No.: 631,755

[22] Filed: Apr. 12, 1996

[51] Int. Cl.[6] .................. B29C 39/12; B29C 39/30
[52] U.S. Cl. .................. 264/153; 29/527.1; 264/138; 264/163; 264/259
[58] Field of Search .................. 156/245; 264/153, 264/163, 259, 266, 132, 138; 29/622, 527.1, 557

[56] References Cited

U.S. PATENT DOCUMENTS

| | | | |
|---|---|---|---|
| 4,366,463 | 12/1982 | Barker | 338/69 |
| 4,536,625 | 8/1985 | Bebie | 200/339 |
| 4,937,408 | 6/1990 | Hattori et al. | 200/314 |
| 5,098,633 | 3/1992 | Hausler | 264/132 |
| 5,338,396 | 8/1994 | Abdala et al. | |
| 5,376,314 | 12/1994 | Share et al. | 264/132 |
| 5,491,313 | 2/1996 | Bartley et al. | |
| 5,514,319 | 5/1996 | Young | 264/132 |

OTHER PUBLICATIONS

Ericsson GH337 Review, Motorola, Inc. internal review, Ft. Lauderdale, Florida, Apr. 9, 1996.

*Primary Examiner*—Richard Crispino
*Attorney, Agent, or Firm*—Dale W. Dorinski

[57] ABSTRACT

A method of fabricating an elastomeric keypad having a hard key cap over the elastomeric key. A sheet (50) containing a key cap (24) with graphics (26) is placed onto a first plate (52) of a molding tool (54). A second plate (58) is then attached to the first plate, covering the graphic film. The first plate and the second plate interact in a manner such that the key cap containing the graphic is excised out of the film and retained in the molding tool assembly. The waste material (60) surrounding the key cap is displaced away from its original position. A third plate (64) is then attached to the assembled first and second plates. The assembled molding tool creates a cavity (66) that is representative of the keypad assembly, and an elastomeric material is molded into that cavity. After the elastomeric material (12) solidifies, the tool is opened, the molded keypad assembly (10) containing the integrally attached rigid key caps is removed.

9 Claims, 6 Drawing Sheets

METHOD OF FABRICATING AN ELASTOMERIC KEYPAD

CROSS REFERENCE TO RELATED APPLICATIONS

This application is related to U.S. application Ser. No. 08/631,753 filed Apr. 12, 1996, by Leon, et al., entitled "Elastomeric Keypad," filed concurrently herewith, and assigned to Motorola, Inc.

TECHNICAL FIELD

This invention relates in general to a method of making elastomeric for keypads for use with electronic devices.

BACKGROUND

Membrane switches such as elastomeric keypads are used in many electronic devices, such as calculators, appliance control panels, automotive dashboards, consumer toys, two-way portable radios, and other industrial-type controls. These types of switches enjoy several advantages over the conventional rocker or toggle switches. They can provide a liquid-tight front surface, making them quite useful in environments where a switch might be exposed to liquid spills, corrosive chemicals or moisture. And, they offer reduced thickness due to the absence of mechanical parts, such as springs, rockers, wiring and large housings. This attribute is extremely desirable in applications such as calculators and other portable consumer electronic devices that are worn on the person or carried in a pocket. Elastomeric keypads typically provide a momentary contact as opposed to a permanent contact in conventional switches. This is important in applications, such as calculators and two-way radios, where a circuit is meant to be only briefly actuated. One example of a backlit keypad is shown in U.S. Pat. No. 5,491,313, incorporated herein by reference.

In the prior art, elastomeric keypads are typically made by injection molding silicone or polyurethane rubber into a cavity. The cavity is formed to represent the keys which are typically joined by a web of thin material. Elastomeric keys find the most use in an array, such as a keypad used on a telephone or radio. The graphic display on each individual key is typically applied in a post-molding operation by a painting or screening operation. One of the problems with type of approach is that if a defect is created on any portion of any one of the graphics, then the entire keypad is defective and must be discarded. This significantly reduces the yield of the overall process and, thus, substantially increases the cost of the keypad. In most cases, the elastomeric keypad is formed from a black elastomeric material and the graphics are painted on the top surface of the keys in a contrasting color such as white. Other elastomer colors of material such as clear, green, white, yellow, red, and blue are also employed either singly or in combination.

One drawback with this approach is that graphics that are painted or screened on the surface of an elastomer are prone to abrasion during use and, thus, over a period of time, the graphics wear off the key and are no longer visible. Some have sought to circumvent this problem by laser-inscribing the graphics into the key, etching through the dark elastomer to an underlying white layer, thus making the graphics more permanent. Again, the problem with this approach is that each feature in the graphic display must be individually created by the laser and, this is a slow and tedious process.

Another prior art solution to this problem has been to attach hard plastic key caps to the elastomeric keys on the keypad. Although this approach solves the wear and abrasion problem, it creates another problem in the manufacturing process. That is, the individual key caps are singly attached to the elastomer keys either manually or in an automated operation. Typically, each key cap is adhesively bonded to its respective key. Obviously, this is a labor intensive and costly process, and further creates opportunities for defects. In a keypad with a large number of keys, such as that used on a personal organizer which may have upwards of fifty keys, one can see that the cost of assembling such a keypad will become prohibitive.

Clearly, it would be a desirable addition to the art if a method were devised where a keypad could be easily and efficiently produced that has graphics that are not susceptible to wear and abrasion. Further, this improved method should create a high-quality product that has a rigid key cap, and be more efficient than the processes used in the prior art.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

A method of fabricating an elastemeric keypad having a hard key cap over the elastomeric key is disclosed. A film or sheet containing key cap with graphics is placed onto a first plate of a molding tool. The first plate has an area that is representative of what later will become a key on the keypad. The film is placed such that the key cap graphic is aligned to the key portion on the first plate. A second plate is then attached to the first plate, covering the graphic film. The first plate and the second plate interact in a manner such that the key cap containing the graphic is excised out of the film and retained in the molding tool assembly. The waste material or web surrounding the key cap is displaced away from its original area so that the elastemeric material can be molded into the key cap. A third plate is then attached to the assembled first and second plates to create an assembled molding tool. The assembled molding tool creates a cavity that is representative of the keypad assembly, and an elastemeric material is molded into that cavity. After the elastomeric material cures into a solid, the tool is opened, the molded keypad assembly containing the integrally attached rigid key caps with the graphics is removed, and the waste material or web is also removed as a second piece and discarded.

An alternate embodiment whereby the key caps are not necessarily excised from the graphic sheet during the assembly of the mold is disclosed. This method uses one plate of the mold to block the web area from being overmolded with elastomer. Rather than excise the web from the key caps, as in the previous embodiment, the web and the key caps remain intact as a single piece during the molding operation. However, after the molding is complete, the process of opening the mold and removing the molded part causes the molded keypad assembly to be excised from the film containing the rigid key caps.

In order to better understand the method of the instant invention, an elastemeric keypad made using this process will first be described.

Figure 1:
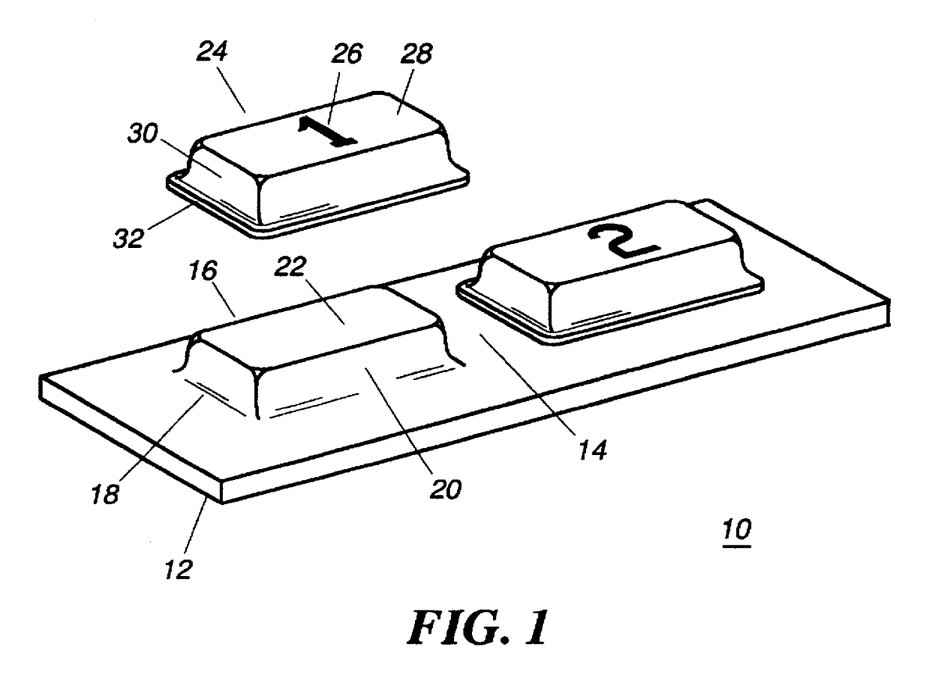
FIG. 1 is an isometric view of an elastomeric keypad created using the molding process in accordance with the present invention.
Figure 2:
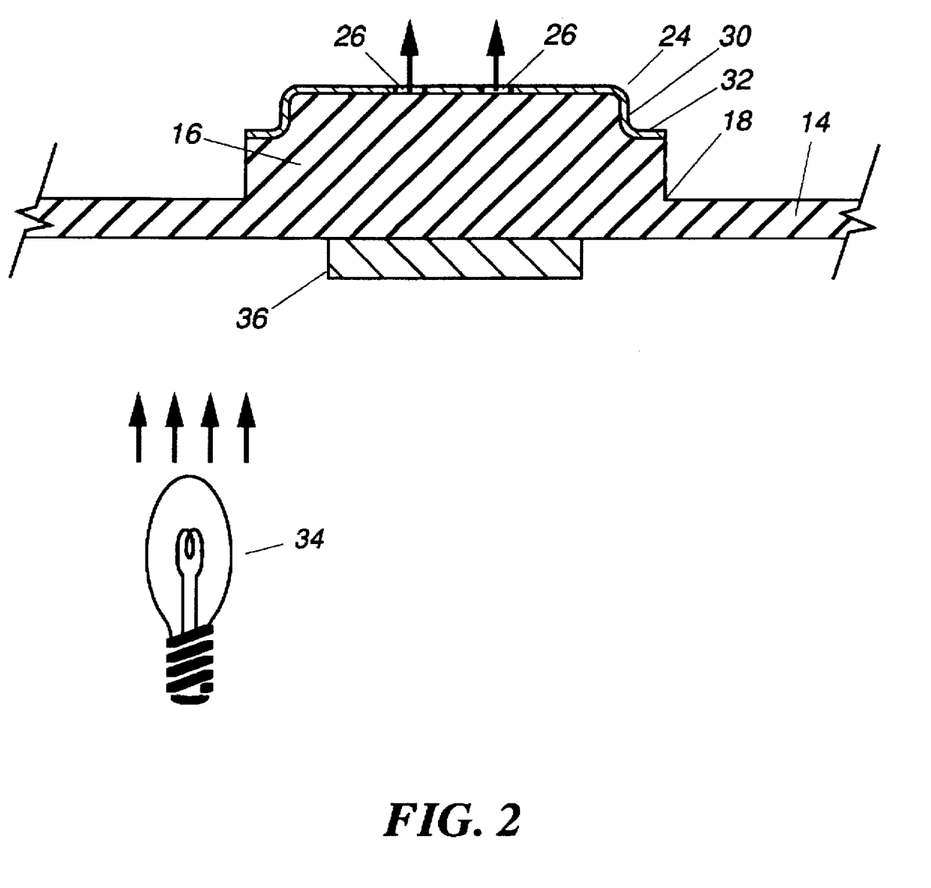
FIG. 2 is a cross-sectional view of a keypad.

Referring now to FIG. 1, a partially exploded isometric view of a keypad, and FIG. 2, a cross-sectional view of the keypad, the keypad assembly 10 consists of a one-piece elastomeric keypad or keypad base 12 that has a web portion 14 and a key portion 16. The key portion 16 has a base 18, a body 20 and a top 22. The key portion 16 is attached to the web portion 14 at the base 18. In the preferred embodiment, the key portion and the web portion are a single piece and serve to form an integral component. Although FIG. 1 shows only two keys, it is to be understood by the reader that any number of keys could be used in accordance with the invention, and the size and the shape of the keys can differ significantly from that shown in the drawing figures. Further, all keys do not have to be the same size and shape, and a plurality of sizes, shapes and configurations may be combined in a single keypad. Those skilled in the art will readily understand that the designer is free to create a wide variety of keypad configurations as seen fit for a particular application. (For example, U.S. Pat. No. 5,491,313.)

A rigid cap 24 is attached to the top of the key portion 16 such that the cap overlies the top 22 and at least a portion of the body 20 of the key 16. In the preferred embodiment, the rigid cap is bonded directly to the elastomer, that is, an adhesive is not used to bond the rigid cap 24 to the keypad base 12. The rigid cap 24 is typically held in place by a chemical bond between the elastomer and the rigid cap. In the preferred embodiment, an adhesion primer may be used to create a chemical bond between the elastomer and the rigid cap. However, in an alternate embodiment, one may instead choose to use an adhesive to secure the rigid cap 24 in place. The rigid cap 24 has a graphic 26 imprinted thereon. The graphic 26 typically consists of one or more alphanumeric characters, but may also include other types of icons. In the preferred embodiment, the graphic 26 is transparent or translucent to visible light and the remainder of the rigid cap 24 is opaque to visible light. The opaque portion 28 of the rigid cap 24 essentially covers most of the key portion 16. This opaque portion 28 is typically black (but may also be other colors), in order to block light from being viewed by a user of the device. To reiterate, the rigid cap typically has an opaque field containing translucent portions that create a graphic, such that light transmitted through the elastomer key portion is blocked by the opaque field and transmitted through the translucent portions. A skirt 30 is formed around the walls of the key portion 16 and may terminate in a flange arrangement wherein the flange 32 is part of the bottom portion of the skirt and extends horizontally out from the vertically walled skirt. The purpose of the skirt 30 is to exclude light emanating from a backlighting source 34 from escaping through the walls of the key portion 16. Further, the flange 32 may be formed to extend underneath a bezel (not shown) or front of a housing.

It can be seen that the preferred embodiment creates a rigid cap 24 that is substantially thinner in cross section than the key portion 16. Typically, the rigid cap is formed of a film that is hydroformed or vacuum thermoformed and, thus the graphics may be imprinted on the surface, on the back side, or in a middle layer of the plastic film. By embedding the graphics in the middle or on the back side, it creates a keypad that is much more durable and is resistant to abrasion and wear than painted keypads.

Typically, the rigid key cap is made of a hard plastic film. Although the structure of the plastic film is not shown, the reader will appreciate that a laminated structure can be easily created, having multiple layers of materials in it which provide both the graphics and the substantially opaque background field. Although the preferred embodiment encompasses an opaque portion made black, one can easily envision alternate colors such as red, green, yellow or blue, or other colors also being used to desired effect. The technology and means to accomplish various colors on a plastic film is well known and the reader is advised to consult the literature for further details on how multiple colors may be created on a plastic film. Additionally, the key cap can also be made from a metal foil, with the graphics formed by etching or cutting portions of the film away.

Figure 3:
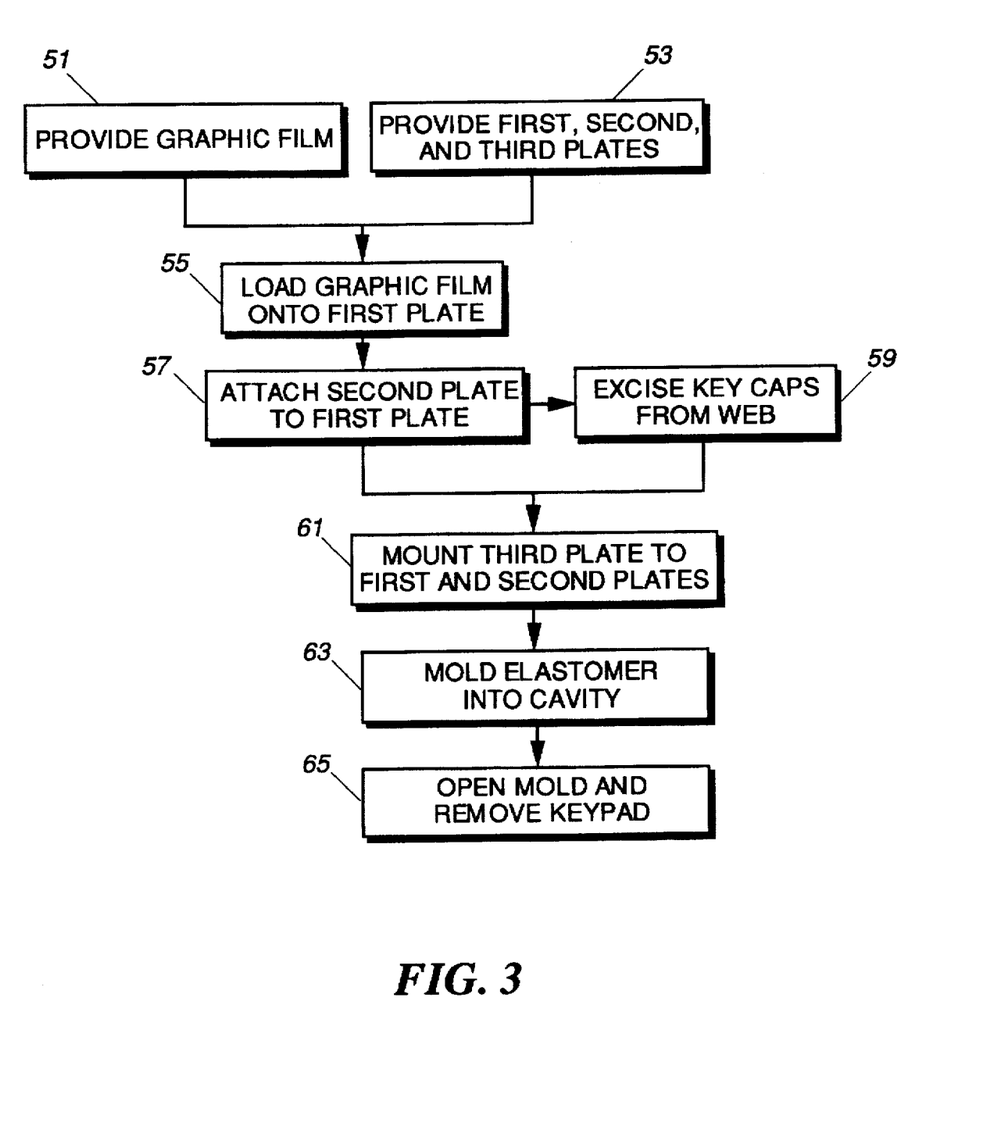
FIG. 3 is a flow chart showing a method of fabricating an elastomeric keypad in accordance with the present invention.
Figure 4:
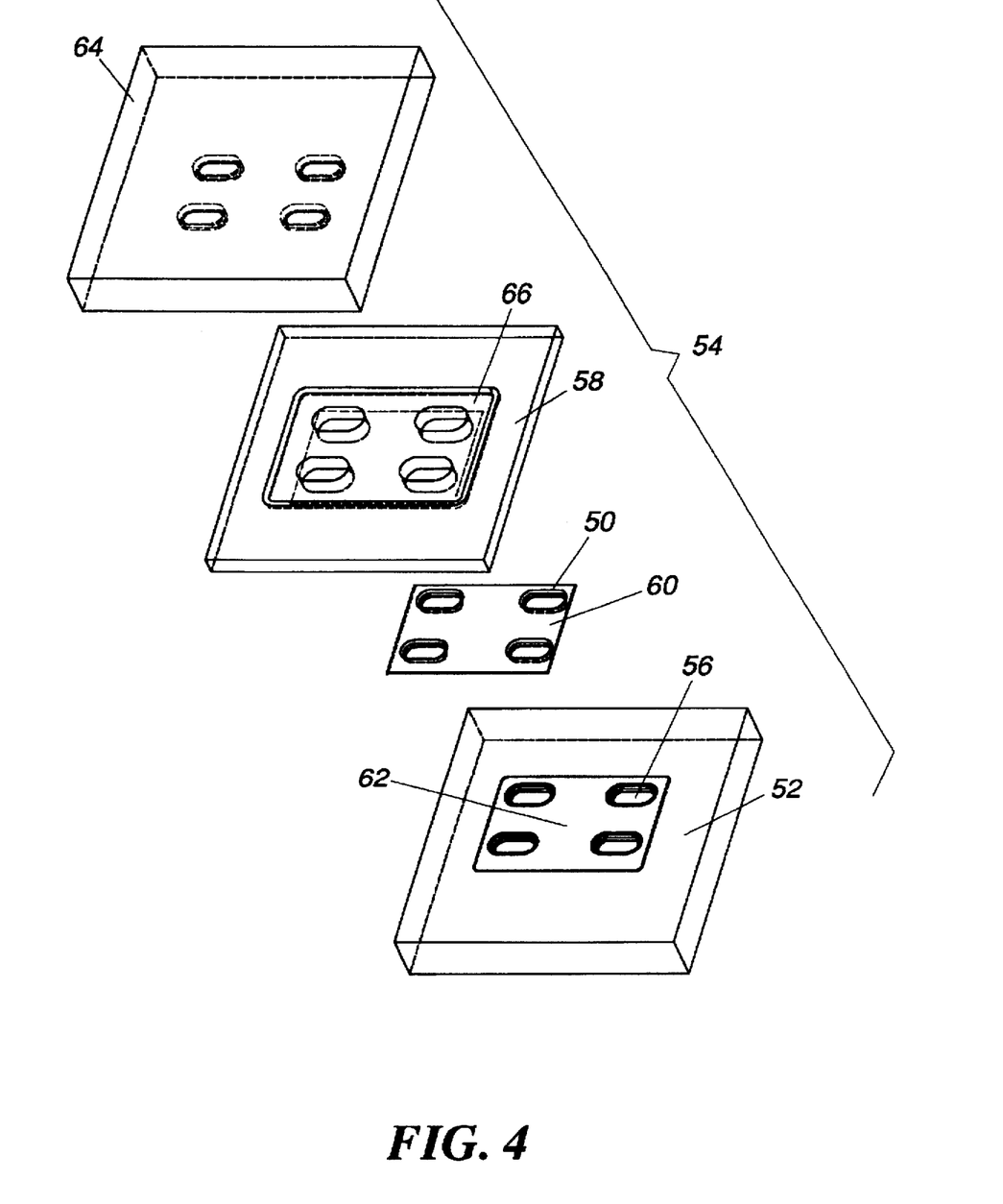
FIG. 4 is an exploded view of one embodiment of a multiplate molding tool used in the invention.
Figure 5:
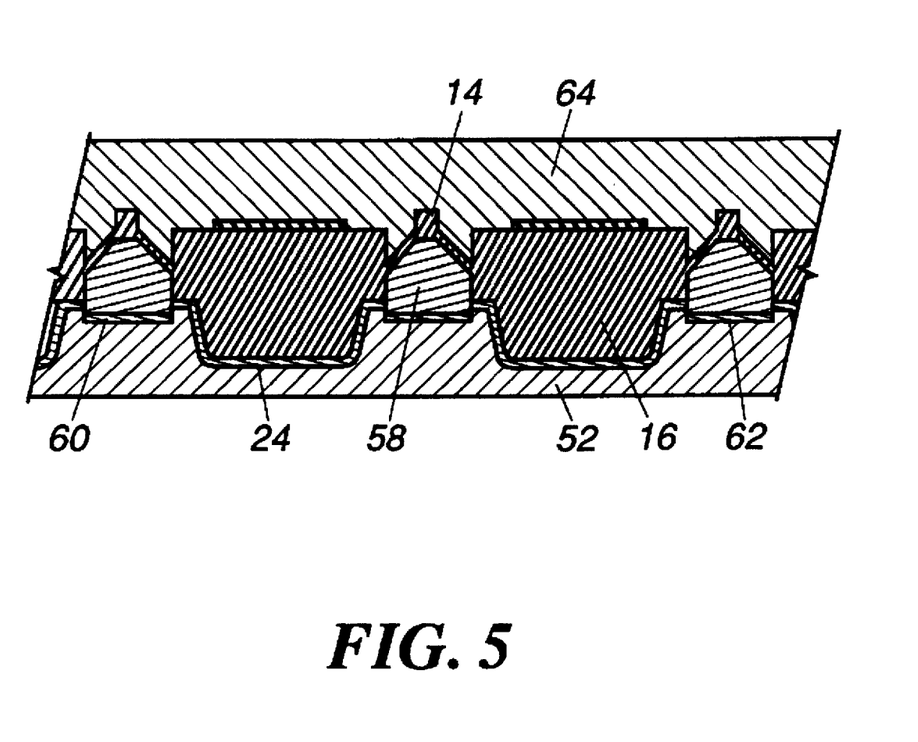
FIG. 5 is a partial cross-section view of the multi-plate molding tool of FIG. 4, after molding.

Refer now to FIGS. 3, 4, and 5. The graphic film 50 containing the key caps having the graphics imprinted thereon, is loaded into a first plate 52 of the multiplate molding tool 54. The formed key caps 24 typically are in a shape that is representative of a convex object. That is, they extend above the plane of the film. In the preferred embodiment of the invention, the graphic film 50 has key caps 24 that are formed into the film. These key caps are typically formed by vacuum thermoforming or hydroforming, but may also be formed in any number of other means familiar to those skilled in the art. The forming process creates a three-dimensional key cap in the graphic film. Steps 51, 53, and 55 indicate the start of the process where the film is loaded onto the first plate of the multiplate mold. Typically, the first plate of the multiplate tool has an area that is to be formed, which ultimately will represent the elastomeric key. In the preferred embodiment, this area consists of one or more recesses 56 in the tool. However, it should be appreciated that an elastomeric keypad can be made wherein the keys have a planar configuration and a recess 56 is not employed. In placing the graphic film 50 onto the first plate 52, the thermo-formed cap 24 is situated so that it nestles or falls into the recess 56, thereby self aligning the entire graphic film. As can be seen in the drawing figures, one would typically use an array of keys and, thus, the graphic film 50 would have an array of formed key caps that fit into this tool.

A second plate 58 is then attached to the first plate over the top of the graphic film 50 (step 57). The second plate 58 serves to further capture the graphic film 50 and the first and second plates combine and interact to shear cut or excise the individual key caps 24 from the graphic film 50 (step 59). In so doing, a web 60 of waste film is left in the tool. Prior to the excising operation produced by first and second plates 52 and 58, the web 60 lays on the first plate, but above a first surface 62 of the first plate. The excising operation not only excises the web from the key caps, but displaces the web of waste material towards the first surface. By displacing the web material away from its original position, an empty space is created in the tool between the keys that allows the web portion 14 of the elastomeric keypad to be formed during the molding operation. Without this displacing operation, it would not be possible to create the web portion 14. This novel configuration and operation allows one to create an elastomeric keypad with molded-on rigid key caps in a single operation, and eliminates the need to individually attach a key cap to each key. By beginning with an array, the key caps can be easily handled and aligned in the tool, with no possibility of error or defects by putting the wrong key cap on the wrong key. In addition, by molding the elastomeric materials directly onto the plastic film, the need to use an adhesive between the elastomer and the film is eliminated. That is, the key cap is chemically bonded to the elastomer in situ.

After the web portion has been excised from the graphic film, a third plate 64 of the multiplate molding tool is attached onto the second plate (step 61). Depending upon the exact configuration of the molding tool and the keypad, the designer may create a cavity in either the first, second, or third plate, or in any combination of these three plates. This cavity 66 serves to define the geometry of the finished keypad, and typically consists of features that will create the elastomeric web portion 14 and the various keys 16. In the preferred embodiment, the cavity 66 is formed in combination between the second plate and the third plate.

Once the three plates of the tool have been assembled, the cavity 66 is filled with the elastomeric material. The elastomeric material typically is dispensed into the cavity 66 as a liquid or gel-type material and sets up to become a solid elastomer through a curing process (step 63). However, materials such as thermoplastic elastomers may also be used, which become molten when heated, but revert to the elastomeric state when cooled to room temperature. During the step of molding, the elastomer is firmly attached to the rigid key cap in the mold. This attachment is typically by means of a chemical bond between the elastomer and the plastic or metal key cap. Those familiar with the art will appreciate that adhesion promoters are commercially available that will enhance the adhesion between two dissimilar materials. It is important to note that this in situ bonding of the elastomer to the key cap does not require the use of any additional adhesives or any step of dispensing adhesives. However, should one desire to include an adhesive layer between the key cap and the elastomer, such an additional step would clearly be encompassed by the scope and spirit of the claimed invention.

After the elastomer has cured or converted into a solid form, the assembled multiplate tool is opened, (step 65), and the formed and completed elastomeric keypad having an integrally bonded key cap is removed from the mold. After removing the second plate from the first plate, the waste material or web 60 portion of the graphic film 50 is also removed from the tool and discarded.

Figure 6:
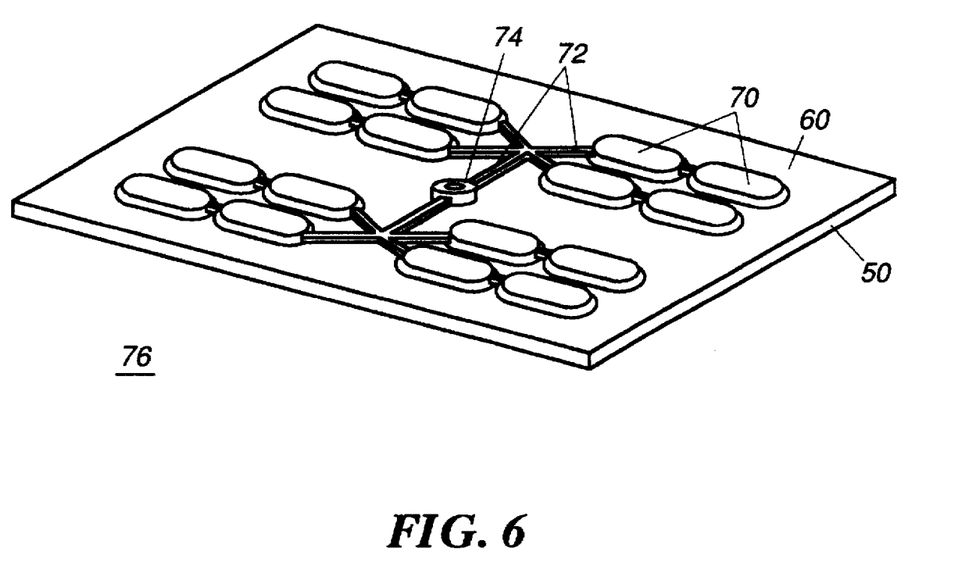
FIG. 6 is an isometric view of an in-molded, decorative graphics sheet containing molded plastic key caps, including a sprue and runner system.

In an alternate embodiment of the invention, a process whereby rigid plastic key caps are molded to an elastomeric key pad encompasses the use of in-mold decorating. In-mold decorating is well known to those skilled in the art and, for example in-mold decorated onto a plastic film. The graphic film 50 has a plurality of the molded-on key caps 70. As previously described, the key caps 70 are attached to the graphic film during the injection molding process. Connecting each of the key caps 70 is a series of a runners 72 that are also typically bonded to the graphic film 50. The runners 72 are connected together and typically terminate in a gate or sprue 74. For purposes of explanation, this entire system comprising the graphic film 50, the molded key caps 70, the runners 72 and the sprue 74 will be referred to as a "key cap assembly 76."

In the alternate embodiment of the invention, the key cap assembly 76 is placed onto a first plate of the multiplate molding tool, such that the molded key caps 70 are situated in recesses in the first plate. The web portion 60 of the assembly 76 is now situated on a first surface of the first plate. The second and third plates of the multiplate mold are then attached to the first plate in order to form the cavity that defines the elastomeric keypad base. The difference between this embodiment and the preferred embodiment is that the first plate and the second plate do not combine to excise the waste portion of the web away from the graphic film, but the second plate and third plate merely serve to define the geometry of the cavity that will later be filled with the elastomer. The waste portion of the graphic film is removed in a subsequent separate step.

The elastomeric material is then molded into the cavity as previously explained, such that the elastomer becomes intimately attached to the back side of the graphic film 50, firmly attaching itself without the use of an adhesive. After the elastomer is cured into a solid, the third plate is removed from the multiplate molding tool assembly, and the formed keypad is ejected from the mold. During the process of ejecting the keypad from the mold, the web 60 of waste film is disengaged from the molded keypad. This is accomplished by a series of ejector pins or prescoring of the graphic film 50 such that the process of ejecting the finished part cleanly tears or excises the waste film away from the finished part. The first and second plates of the tool combine and cooperate to retain the web or waste film 60 in the mold during the ejection process. The first and second plates are then parted from each other and the web of waste film 60 is removed from the molding tool to complete the cycle.

In this alternate embodiment of the invention, the rigid cap attached to the top of the key portion has the graphic imprinted on a bottom surface of the cap. The graphic and the cap are then formed to be flush with the top surface of the key portion 16 and the rigid cap is substantially transparent. The transparent portion of the rigid cap lies above the graphic and is formed in such a manner so as to act like a magnifying lens enlarging the graphics when viewed by the user. This embodiment provides the advantages of a high-contrast, back-lit elastomeric keypad along with a keypad that has a hard surface providing good tactile feel and good wear, and further creates a transparent lens that magnifies the graphics. This is important in systems where the keys and the accompanying graphics are small and difficult to read.

In summary, the instant invention provides a number of advantages such as an efficient automated process for fabricating superior keypads having all the best features of prior art keypads with minimal additional costs. The cost of manufacturing using this process is low because all the keys are molded as an integral part, and all the key caps are likewise molded integrally to the elastomeric keys. An adhesive is not necessary, thus eliminating another manual operation. The ability to place all of the rigid key caps in the mold in an array format eliminates the need to individually place each key cap on each separate key. Thus, a novel process has been created that provides a high-speed, low-cost, highly accurate method of creating a keypad having many desirable features.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating an elastomeric keypad having a hard key cap on an elastomeric key, comprising the steps of:

providing a film having a key cap graphic portion provided thereon, and also having a non-graphic portion;

placing the film onto a first plate of a multi-plate molding tool, the first plate having a portion representative of the elastomeric key, and the film arranged so that the key cap graphic portion is aligned with said portion;

mounting a second plate of the multi-plate molding tool onto the first plate, such that the first and second plates co-operate to excise the key cap graphic portion from the non-graphic portion;

mounting a third plate of the multi-plate molding tool onto the second plate to form an assembled multi-plate tool having a cavity defining the elastomeric keypad;

filling the cavity with an elastomeric material and curing the elastomeric material to form an elastomeric keypad having an integral key cap; and opening the assembled multi-plate tool, removing the formed elastomeric keypad having an integral key cap, and removing the excised non-graphic portion from the multi-plate molding tool.

2. The method as described in claim 1, wherein the excised non-graphic portion is displaced onto a surface of the first plate.

3. The method as described in claim 1, wherein the non-graphic portion is displaced by the second plate onto a surface of the first plate.

4. The method described in claim 1, wherein the film is plastic or metal.

5. The method as described in claim 1, wherein the step of providing further comprises a step of forming the film to create three-dimensional key caps.

6. A method of fabricating an elastomeric keypad having plastic key caps on elastomeric keys, comprising the steps of:

providing a plastic film having convex key caps formed therein, the convex key caps each having a graphic printed thereon, and the plastic film having a web connecting the convex key caps;

providing a multi-plate molding tool having a first plate, a second plate and a third plate, the first plate having a first surface containing recesses representative of the elastomeric keys;

placing the plastic film onto the first plate such that the convex key caps are situated in the recesses and the web is situated above the first surface;

mounting the second plate onto the first plate such that the first and second plate cooperate to excise the convex key caps from the plastic film and to displace the web toward the first surface;

after the step of mounting the second plate, mounting the third plate onto the second plate to form an assembled multi-plate molding tool having a cavitydefining the elastomeric keypad;

filling the cavity with an elastomeric material and curing the elastomeric material to form an elastomeric keypad having the convex key caps integrally attached to the elastomeric keys; and after the step of molding, opening the assembled multi-plate molding tool, removing the elastomeric keypad, and removing the displaced web from the multi-plate molding tool.

7. The method as described in claim 6, wherein the web is displaced into an opening in the first plate.

8. The method as described in claim 6, wherein the step of providing a plastic film having convex key caps further comprises forming the plastic film to create the convex key caps.

9. A method of fabricating an elastomeric keypad having plastic caps on elastomeric keys, comprising the steps of:

providing a planar plastic film having an array of graphics printed thereon and having plastic caps molded onto the plastic film such that the caps are intimately attached to the planar plastic film and are situated on the graphics, and the planar plastic film having a web portion connecting the graphics;

providing a multi-plate molding tool having a first plate, a second plate and a third plate, the first plate having a first surface containing recesses representative of the elastomeric keys;

placing the planar plastic film onto the first plate such that the plastic caps are situated in the recesses and the web portion is situated on the first surface;

after the step of placing, mounting the second plate and the third plate onto the first plate to form an assembled multi-plate molding tool having a cavity defining the elastomeric keypad;

molding an elastomeric material into the cavity and solidifying the elastomeric material to form an elastomeric keypad having the plastic caps and associated graphics integrally attached to the elastomeric keys; and after the step of molding, removing the third plate from the multi-plate molding tool and ejecting the molded keypad with the integrally molded plastic caps from the tool, the first and second plates cooperating to retain the web portion from the molded keypad and integrally molded plastic caps;

opening the assembled multi-plate molding tool and removing the web portion from the multi-plate molding tool.

* * * * *